(12) United States Patent
Kim et al.

(10) Patent No.: US 11,383,751 B2
(45) Date of Patent: Jul. 12, 2022

(54) MOUNTING AND SECURING STRUCTURE FOR DAMPER UNIT IN STEERING WHEEL AND STEERING WHEEL

(71) Applicant: Autoliv Development AB, Vargarda (SE)

(72) Inventors: Jinkeun Kim, Kanagawa (JP); Toshiaki Ebana, Kanagawa (JP); Takashi Seki, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/254,682

(22) PCT Filed: May 14, 2019

(86) PCT No.: PCT/JP2019/019042
§ 371 (c)(1),
(2) Date: Dec. 21, 2020

(87) PCT Pub. No.: WO2020/003777
PCT Pub. Date: Jan. 2, 2020

(65) Prior Publication Data
US 2021/0269080 A1    Sep. 2, 2021

(30) Foreign Application Priority Data

Jun. 25, 2018   (JP) .............................. JP2018-119665

(51) Int. Cl.
*B62D 1/10* (2006.01)
*B60R 21/203* (2006.01)
(Continued)

(52) U.S. Cl.
CPC ............ *B62D 1/10* (2013.01); *B60R 21/2037* (2013.01); *B62D 7/222* (2013.01)

(58) Field of Classification Search
CPC ... B62D 1/04; B62D 1/10; B62D 7/22; B62D 7/222; B60R 21/2032; B60R 21/2035; B60R 21/2037
See application file for complete search history.

(56) References Cited

U.S. PATENT DOCUMENTS 8,985,623 B2 *   3/2015   Kondo ................. F16F 7/1028
                                                    280/731
9,550,525 B2 *   1/2017   Ishii .................... B60R 21/2037
(Continued)

FOREIGN PATENT DOCUMENTS

EP          2085290 A1     8/2009
JP        2009-202859 A    9/2009
(Continued)

*Primary Examiner* — Jonathan Ng
*Assistant Examiner* — Daniel M. Keck
(74) *Attorney, Agent, or Firm* — Foley & Lardner LLP

(57) ABSTRACT

A collar member formed as a hollow cylinder having an opening at one end into which a mounting pin member of the damper unit is inserted, and which is secured to a cored bar member, a seat part provided at the other end of the collar member in which the insertion side tip of the pin is seated, a positioning groove part formed on the collar member between the seat part and the opening, a locking groove part formed on the pin that is positioned in the positioning groove part when the insertion side tip is seated in the seat part, and a spring member provided on the cored bar member inserted through the positioning groove part that is elastically locked by the locking groove part when the insertion side tip is seated in the seat part and retains the pin.

8 Claims, 6 Drawing Sheets

(51) Int. Cl.
   *B62D 7/22*   (2006.01)
   *B62D 1/04*   (2006.01)

(56) References Cited

U.S. PATENT DOCUMENTS

| | | | |
|---|---|---|---|
| 10,150,441 B2 * | 12/2018 | Sella | B62D 7/222 |
| 10,875,564 B2 * | 12/2020 | Minami | B60R 21/2037 |
| 11,034,374 B2 * | 6/2021 | Banno | B60R 21/2037 |
| 2009/0218739 A1 | 9/2009 | Terada et al. | |
| 2013/0076011 A1 * | 3/2013 | Umemura | B60Q 5/003 |
| | | | 280/728.2 |
| 2014/0306432 A1 * | 10/2014 | Obayashi | B62D 1/10 |
| | | | 280/728.2 |

FOREIGN PATENT DOCUMENTS

| | | |
|---|---|---|
| JP | 2010-69935 A | 4/2010 |
| JP | 2014-94703 A | 5/2014 |
| WO | 2016/002507 A1 | 1/2016 |

\* cited by examiner

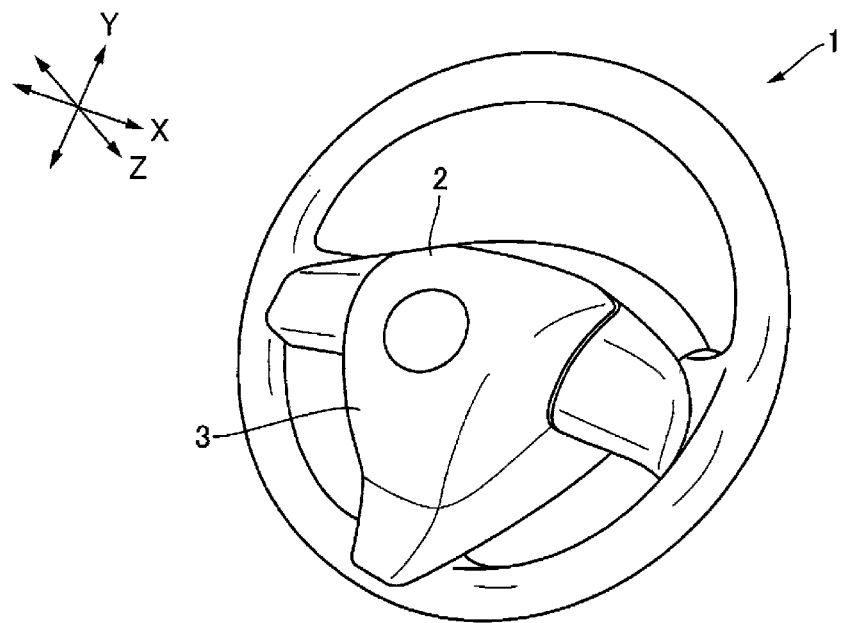
[FIG. 1A]
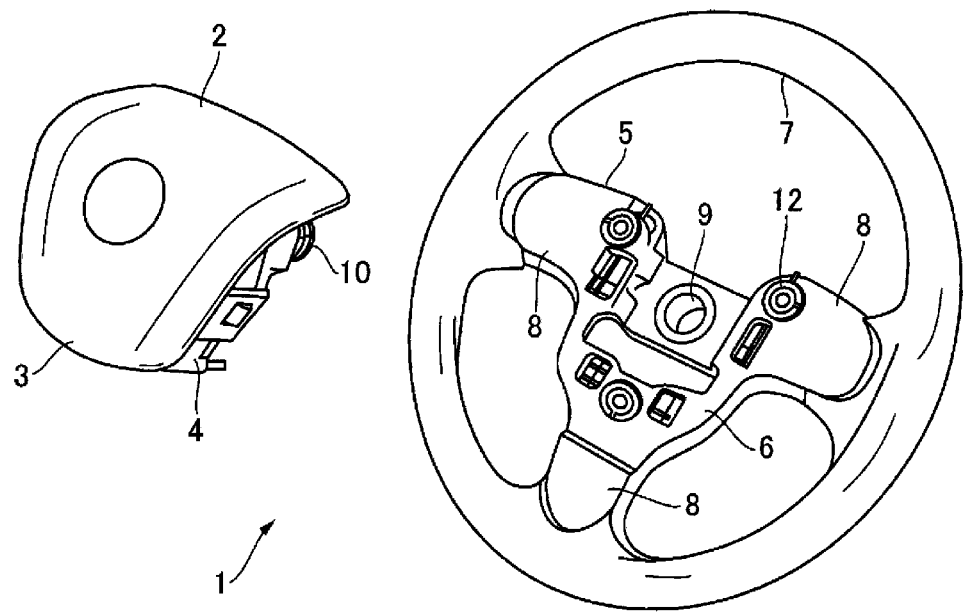
[FIG. 1B]

[FIG. 2]
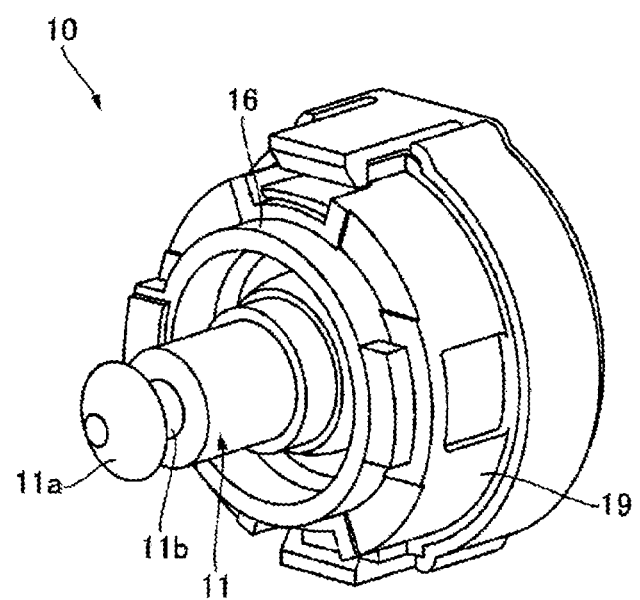

[FIG. 3]
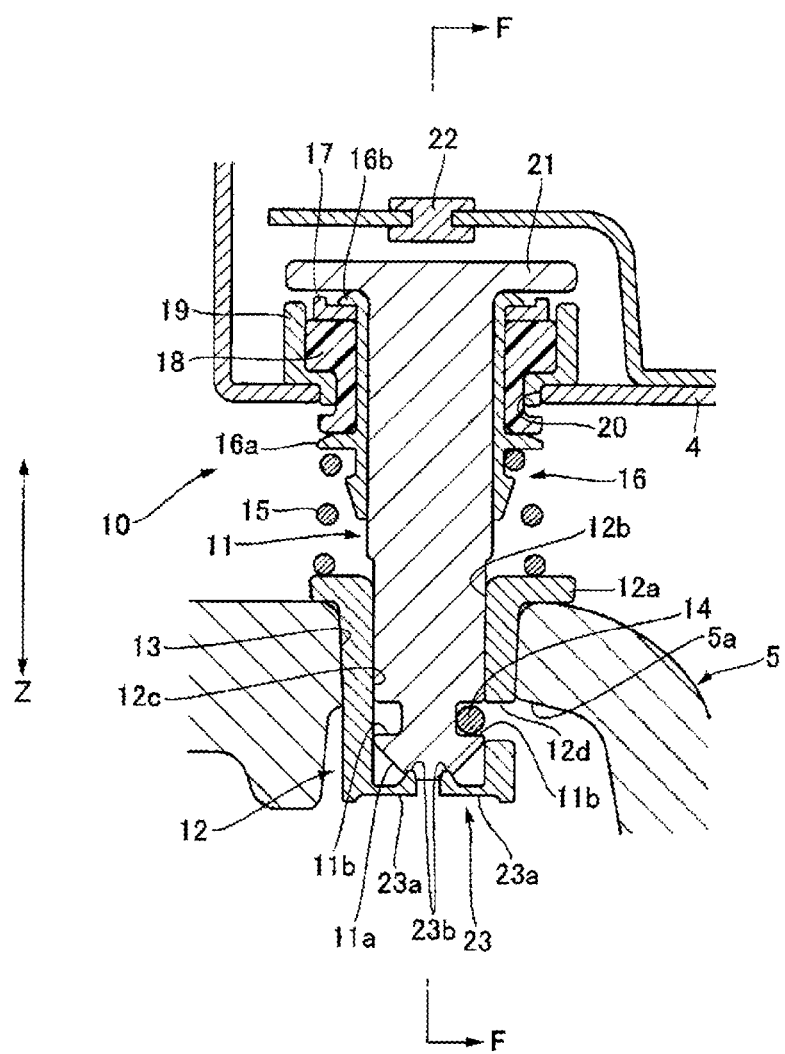

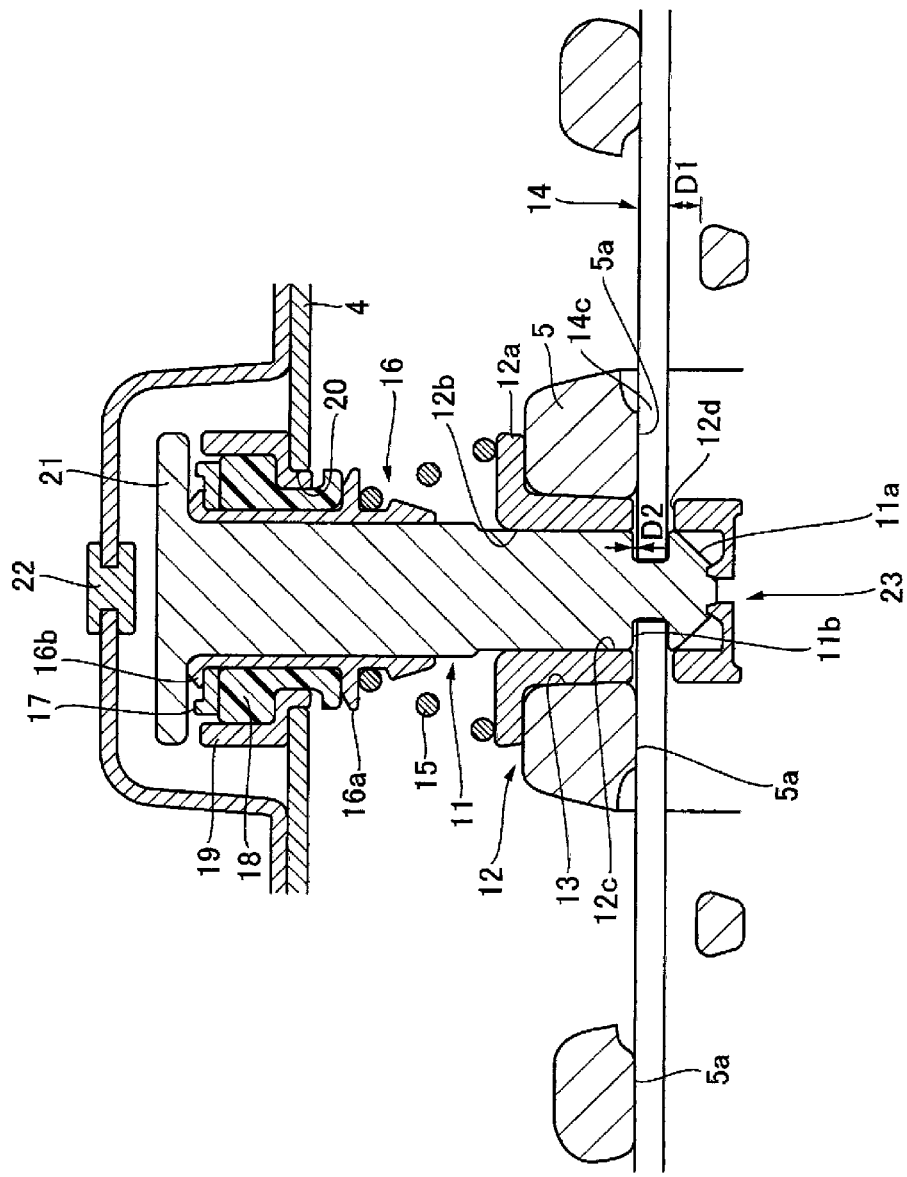
[FIG. 4]

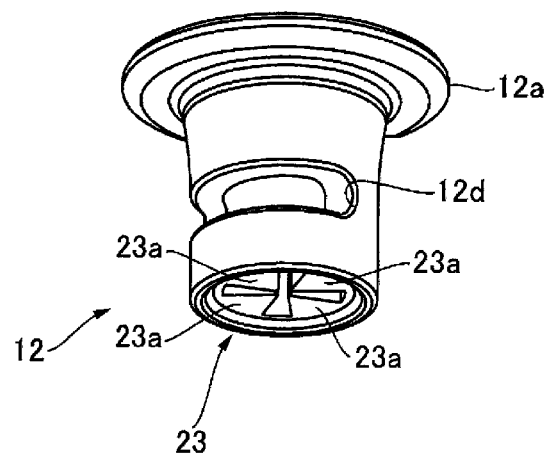
[FIG. 5A]
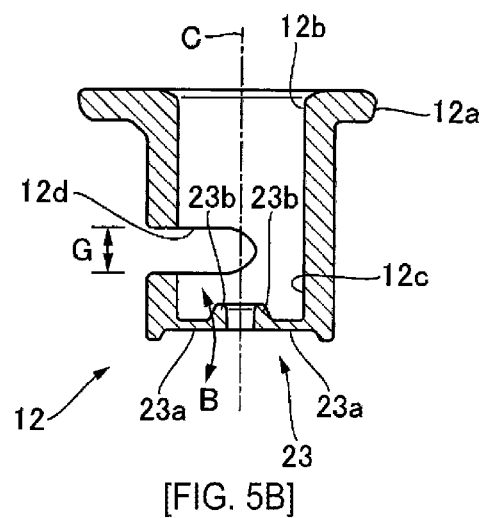
[FIG. 5B]

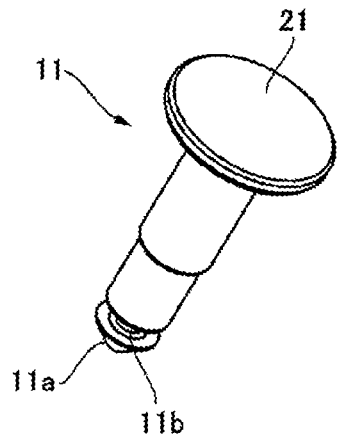
[FIG. 6A]
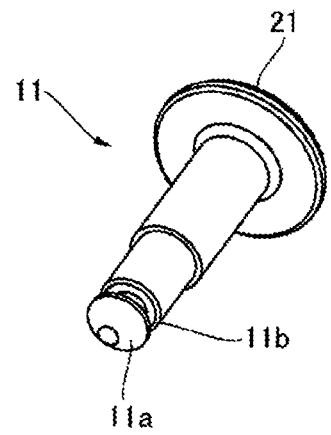
[FIG. 6B]
[FIG. 7]
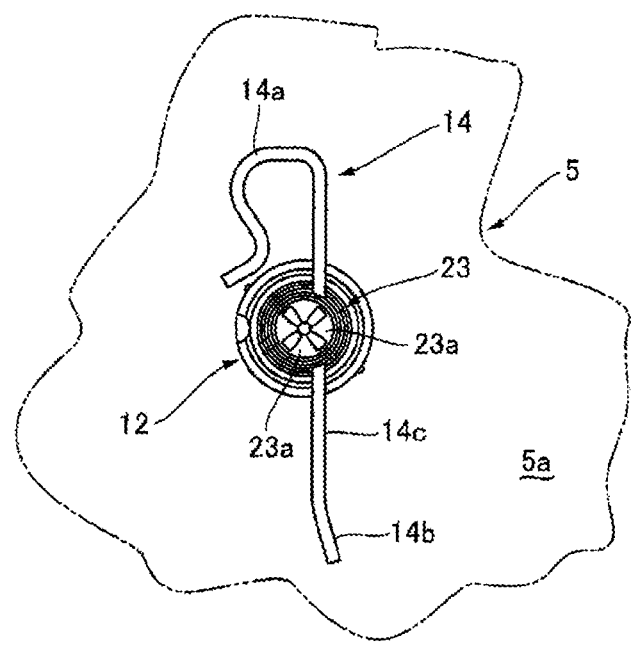

MOUNTING AND SECURING STRUCTURE FOR DAMPER UNIT IN STEERING WHEEL AND STEERING WHEEL

TECHNICAL FIELD

The present invention is related to a mounting and securing structure for the damper unit in a steering wheel, and a steering wheel thereof, that enables a mounting pin member to be mounted and secured to the supporting part, can reduce noise and improve durability, and can improve vibration damping of the steering wheel by ensuring appropriate transmission of vibration to the airbag module, and that further has a simple structure and is easy to mount.

BACKGROUND

In the known art, Patent Document 1 is known, regarding a technology having a configuration in which a damper unit that damps vibration of a steering wheel is assembled between the steering wheel and an airbag module functioning as a damper mass.

In the "steering wheel with airbag device" of the patent document 1, the horn switch mechanism is provided with a securing pin that is secured to the core of the steering wheel main body as well as a support member that retractably supports the bag holder with respect to the core, and a movable attachment member as an insulating part that is interposed as electrical insulation between the securing pin and bag holder. In addition, the horn switch mechanism is provided with a compression coil spring as a biasing member that biases the bag holder away from the cored bar, and a contact terminal as a movable side contact part that moves with the bag holder. Furthermore, the contact terminals make contact with the securing pins and conduct based on movement of the bag holder toward the core side against the bias force of compression coil spring, activating the horn mechanism of the vehicle.

RELATED ART DOCUMENTS

Patent Documents

Patent Document 1: Japanese Unexamined Patent Application 2010-69935

SUMMARY OF THE INVENTION

Problem to be Solved by the Invention

Damper units, which dampen the vibration of the steering wheel, are normally integrated between the airbag module, which serves as the damper mass, and the steering wheel, and connect the steering wheel and the airbag module.

Damper units are provided with mounting pin members for this connection. The mounting pin member is mounted and secured to a support part of either the steering wheel or the airbag module. As a result, the steering wheel and the airbag module are connected by the damper unit.

The mounting pin member itself vibrates in the damper unit after mounting to the support part and adversely affects vibration transmission from the steering wheel to the airbag module, which causes problems in that the vibration damping of the steering wheel cannot be ensured as designed, or abnormal sound is generated due to vibration.

The present invention was conceived in light of the conventional issues described above, and an object thereof is to provide a mounting and securing structure for the damper unit in a steering wheel, and a steering wheel thereof, that enables a mounting pin member to be mounted and secured to the supporting part, can reduce noise and improve durability, and can improve vibration damping of the steering wheel by ensuring appropriate transmission of vibration to the airbag module, and that further has a simple structure and is easy to mount.

Means for Solving the Problem

The mounting and securing structure for the damper unit of the steering wheel according to the present invention is designed to incorporate a damper unit that dampens the vibrations of the steering wheel between the steering wheel and the airbag module, as the damper mass, by mounting and securing a mounting pin member for the damper unit to the supporting part of either the steering wheel or the airbag module, and is composed of a collar member that is formed in a hollow cylindrical shape with an opening for inserting the mounting pin member on one end in the length direction, a seat part where the insertion side tip of the mounting pin member is seated provided on the other end in the length direction of the collar member, a positioning groove part positioned on the collar member between the seat part and the opening and formed so as to intersect the length direction, a locking groove part formed on the mounting pin member and positioned on the positioning groove part when the insertion side tip is seated in the seat part, and a spring member provided on the supporting part inserted through the positioning groove part that is elastically locked by the locking groove part when the insertion side tip is seated in the seat part and retains the mounting pin member.

The seat part is preferably composed of a plurality of lever pieces protruding in a cantilevered manner from an inner circumferential surface of the collar member having a hollow cylindrical shape.

The seat part preferably includes a grip that grips the insertion side tip of the mounting pin member.

The steering wheel according to the present invention is provided with a mounting and securing structure for the damper unit for the steering wheel.

Effects of the Invention

In the mounting and securing structure for the damper unit in the steering wheel and steering wheel according to the present invention, the mounting pin member is prevented from moving (vibrating) between the steering wheel and the airbag module, and the steering wheel can be stably mounted and secured to the support unit, noise reduction and durability can be improved, and the vibration damping effect of the steering wheel can be improved based on ensuring appropriate vibration transmission to the airbag module, and furthermore, a simple configuration and excellent mounting workability can be exhibited.

BRIEF DESCRIPTION OF THE DRAWINGS

FIG. 1 is an explanatory diagram illustrating a configuration of a steering wheel to which a mounting and securing structure for the damper unit is applied to a steering wheel according to the present invention.

FIG. 2 is a perspective view illustrating an example of a damper unit provided on the steering wheel illustrated in FIG. 1.

FIG. 3 is a cross-sectional view illustrating a preferable embodiment of a mounting and securing structure for the damper unit in a steering wheel according to the present invention.

FIG. 4 is a cross sectional view taken along the F-F line in FIG. 3.

FIG. 5 is an explanatory diagram describing a collar member used in the mounting and securing structure for the damper unit illustrated in FIG. 3.

FIG. 6 is an explanatory diagram describing the mounting pin member used in the mounting and securing structure for the damper unit illustrated in FIG. 3.

FIG. 7 is an explanatory diagram describing a state in which a spring member is installed on the cored bar member and is used in the mounting and securing structure for the damper unit illustrated in FIG. 3.

DESCRIPTION OF THE PREFERRED EMBODIMENT

Hereinafter, preferred embodiments of a mounting and securing structure for the damper unit on a steering wheel and the steering wheel according to the present invention will be described in detail with reference to accompanying drawings. FIG. 1 is a diagram illustrating an overview of a steering wheel 1 to which the mounting and securing structure for the damper unit in the steering wheel is applied according to the present invention.

FIG. 1 (a) illustrates the entirety of the steering wheel 1. Note that in the following drawings including FIG. 1 (a), each direction is illustrated under the assumption that the steering position of the steering wheel 1 mounted in the vehicle is in a neutral position. For example, for the Z-axis, the direction towards the vehicle front wheels of the steering column (steering shaft, not shown) is down and the direction toward the steering wheel 1 is up.

In addition, in a plane orthogonal to the Z axis, the X axis is set from the 9 o'clock direction (left direction) toward the 3 o'clock direction (right direction), while the Y axis is set from the 6 o'clock direction (rear direction) toward the 12 o'clock direction (forward direction), with the 12 o'clock position of an analog 12-hour clock as the front side of the vehicle. Alternatively, a side viewed from a side of a driver is referred to as a front side, and an opposite side thereof is referred to as a back side.

The steering wheel 1 is installed at the driver seat of a vehicle so as to be connected to the steering shaft that passes through the steering column (not shown) and transmits the operating force of the driver to a steering gear or the like.

An airbag module 2 that functions as a front airbag in an emergency is mounted in the center of the steering wheel 1. This airbag module 2 also functions as a horn switch that a driver pushes to sound the horn during normal times.

FIG. 1 (b) is an exploded view where the airbag module 2 has been removed from the steering wheel 1 in FIG. 1 (a).

As illustrated in FIG. 1 (b), the airbag module 2 on the side of the driver is covered with a resin horn cover 3 which functions as a design surface. A box-shaped housing 4 is provided below the horn cover 3, such that an airbag cushion (not shown) is folded and stowed thereinside so as to be expanded and deployed in the event of an emergency. An inflator (not shown in the drawings) is also provided within the housing 4.

When a signal is transmitted from a sensor of the vehicle in an emergency, an inflating gas is supplied from the inflator 6 to the airbag cushion, and the airbag cushion tears open the horn cover 3 to be unfolded and expand in the vehicle compartment to restrain the driver.

The base part of the steering wheel 1 is composed of a cored bar member 5 made of metal. The cored bar member 5 is primarily configured to include a central boss region 6, a circular rim 7 that a driver grips, and spokes 8 that connect the boss region 6 and the rim 7. A shaft hole 9 connected to a steering shaft is provided in the boss region 6.

In addition to functioning as a front airbag, the airbag module 2 of the present embodiment functions as a horn switch as described above and further as a module damper mechanism that dampens vibrations. Configurational elements that realize the function as the horn switch and the module damper mechanism will be described below.

The airbag module 2 has a plurality of damper units 10 arranged in the housing 4. The damper unit 10 is a member that elastically attaches the housing 4 to the cored bar member 5 and is central to the module damper mechanism.

A rod-shaped mounting pin member 11 (hereinafter referred simply as "pin") protrudes from the damper unit 10 toward the boss region 6 of the cored bar member positioned in the lower Z-axis region (see FIG. 3). This pin 11 is inserted into a hole 13 formed on the cored bar member 5 via a collar member 12 attached to the cored bar member 5, and is connected to a shaft-shaped spring 14 installed on a back surface 5a of the cored bar member 5.

This connection between the pin 11 and the spring 14 attaches the airbag module 2 to the cored bar member 5.

As illustrated in FIG. 3, the pin 11 is inserted into the cored bar member 5 through a horn spring 15 and the collar member 12. The horn spring 15 is coiled and is installed between the airbag module 2 and the cored bar member 5 to provide a gap between them. Hence, the airbag module 2 released from being pushed down by the driver during a horn operation is separated from the cored bar member 5 to return to the original position thereof.

Briefly describing the damper unit 10, as illustrated in FIG. 2 and FIG. 3, the damper unit 10 is provided in a manner surrounding an inner sleeve 16 between the inner sleeve 16 and an annular piece 17 locked by an annular sheet 16a formed on the inner sleeve 16 and an annular flange 16b formed outwardly on the inner sleeve 16 in a position facing the annular sheet 16a, is composed of a ring-shaped elastic body 18 and an annular outer sleeve 19 provided covering the exterior of the elastic body 18, where the inside of the inner sleeve 16 is configured such that pins 11 of the damper unit 10 are inserted in a freely sliding manner in the inner sleeve 16.

The outer sleeve 19 is attached to a through hole 20 in the housing 4 composed of the airbag module 2, which secures the damper unit 10 to the airbag module 2.

The airbag module 2 provided with the damper unit 10 is connected to the steering wheel 1 by mounting and securing the pin 11 to the cored bar member 5, as described below.

The airbag module 2 is provided so as to be moveable toward the steering wheel 1 side by means of a pin 11 on the steering wheel 1 side being slidably inserted into the inner sleeve 16 of the damper unit 10.

In other words, the airbag module 2 is elastically supported by the damper unit equipped with the elastic body 18 and is slidably connected to the steering wheel 1 via the pin 11.

The vibration of the steering wheel 1 is transmitted to the damper unit 10 via the pin 11, and the transmitted vibration is dampened in the damper unit 10 that uses the airbag module 2 as the damper mass.

On the other hand, the pin 11 is formed of a metal material having electrical conductivity and has a horn switch first contact 21 at one end located on the side of the housing 4.

The housing 4 is provided with a second contact 22 arranged facing the first contact 21 in the expanding and contracting direction (Z-axis direction) of the horn spring 15.

When the airbag module 2 is pushed in toward the steering wheel 1, the inner sleeve 16 of the damper unit 10 provided in the airbag module 2 slides relative to the pin 11, compressing the horn spring 15.

This causes the second contact 22 to move toward and contact the first contact 21, causing the horn to sound. When the push-in pressure on the airbag module 2 is released, the airbag module 2 is retracted by the horn spring 15, and this causes the second contact 22 to move away from the first contact 21 and stops the horn from producing sound.

Next, a mounting and securing structure for the damper unit in the steering wheel according to the present embodiment and a steering wheel provided with the mounting and securing structure will be described. As illustrated in FIG. 3 and FIG. 4, the present embodiment is a case in which the damper unit 10 installed on the airbag module 2 side is mounted and secured to the support part of the steering wheel 1 by the mounting pin member 11 of the damper unit 10. In the illustrated example, the cored bar member 5 of the steering wheel 1 is considered to be the support part.

However, contrary to FIG. 3 and FIG. 4, the present invention includes a configuration in which a damper unit 10 installed on the steering wheel 1 side is mounted and secured to a support part (such as the housing 4) of the airbag module 2 by the mounting pin member 11 of the damper unit 10.

FIG. 3 is a cross-section view illustrating the mounting and securing structure. FIG. 4 is a cross-sectional view taken along the F-F line in FIG. 3. FIG. 5 is an explanatory diagram describing the collar member 12 used in the mounting and securing structure for the damper unit in FIG. 3. FIG. 5 (a) is a perspective view of the collar member 12, and FIG. 5 (b) is a side cross-sectional view of the same.

A hole 13 for inserting the pin 11 from the front side toward the back side is formed through the cored bar member 5. The collar member 12 is detachably fitted and secured in the hole 13. The collar member 12 may be formed from any material, and as an example can be formed using a synthetic resin material. As illustrated in FIG. 3 to FIG. 5, the collar member 12 is formed into a hollow cylindrical shape in which an annular flange 12a is provided at one end in the length direction. The collar member 12 is secured to the hole 13 by the flange 12a being pressed against the front side of the cored bar member 5. The flange 12a also serves as a spring seat for the horn spring 15.

The collar member 12 has a circular opening 12b for inserting a pin 11 into that collar member 12 at one end in the length direction where the flange 12a is formed. The collar member 12 is formed in a truncated cone shape in the length direction (Z-axis direction), such that the outer diameter dimension and the inner diameter dimension successively narrow in order from one end with the opening 12b toward the other end. By being formed as a truncated cone shape, the collar member 12 is firmly fitted and secured in the hole 13 when pressed from the front side of the cored bar member 5 toward the back side.

A seat part 23 is provided at the other end of the collar member 12 in the length direction, where the insertion side tip 11a of the pin 11, which is passed inwardly into the collar member 12, is seated. As an example, the seat part 23 is provided by integrally forming the collar member 12. In the case where the collar member 12 is a synthetic resin material, the seat part 23 is integrally formed by resin molding. "Seated" preferably refers to a state in which the insertion side tip 11a of the pin 11 and the seat part 23 come into contact with each other when the pin 11 is passed toward the collar member 12. "Seated" further means to include a non-contact state such that there is a slight gap between the insertion side tip 11a and the collar member 12 and is not limited to a state of contact.

As described above, the pin 11 is provided with a damper unit 10 on one end side in the length direction where the first contact 21 is formed, and the other end in the length direction protruding from the damper unit 10 is the insertion side tip 11a.

FIG. 6 is an explanatory diagram describing the mounting pin member used in the mounting and securing structure for the damper unit illustrated in FIG. 3 and FIG. 4, where FIG. 6 (a) is an oblique view viewed obliquely from above and FIG. 6 (b) is an oblique view viewed obliquely from below.

As illustrated in FIG. 6, the insertion side tip 11a is formed in a cone-shape, and an annular locking groove part 11b is formed on the first contact 21 positioned at a positioning groove part 12d described below when the insertion side tip 11a is seated in the seat part 23.

The pin 11 is inserted into the collar member 12 to a depth where the insertion side tip 11a reaches the seat part 23. The seat part 23 is formed so as to substantially block the other end of the collar member 12. In the present embodiment, the seat part 23 is composed of a plurality of lever pieces 23a. Each lever piece 23a is cantilevered protruding from the inner surface 12c of the collar member 12 towards the central axis C (see FIG. 5(b)) along the length direction of the collar member 12.

In other words, the lever piece 23a, when assuming a wall that blocks the other end of the collar member 12, is demarcated and formed by a small hole formed in a central position of a wall and a plurality of slits extending radially from this small hole toward the inner circumferential surface 12c of the collar member 12.

The lever piece 23a is formed so that the protruding end of the collar member 12 on the side of the central axis C is elastically deformable in the length direction of the collar member 12 with the inner circumferential surface 12c position of the collar member 12 as the supporting end (see arrow b in FIG. 5 (b)). In the illustrated example, four lever pieces 23a are provided with the same shape and size, but the number of levers is not restricted.

The seat part 23 is provided with a grip 23b that grips the insertion side tip 11a of the pin 11. The grip 23b is formed to slightly lift from the seat part 21 to the opening 12b side to enclose the insertion side tip 11a of the cone-shaped pin 11.

In the present embodiment, the seat part 23 is formed by a plurality of levers 23a, and the grip 23b is formed slightly rising to the protruding end of the lever piece 23a toward the opening 12b. The grip 23b of the lever piece 23a elastically clamps and grips and retains the cone-shaped insertion side tip 11a and surrounding area with the elastic righting action of the lever piece 23a elastically deformed by the insertion side tip 11a of the pin 11 seated in the seat part 23.

The positioning groove part 12d is formed in the collar member 12 at a position on the back side of the cored bar member 5. The positioning groove part 12d is formed in a lateral orientation that intersects the length direction of the collar member 12 between the seat part 23 and the opening 12b of the collar member 12.

As illustrated in FIG. 5, the positioning groove part 12*d* is formed so as to appear to be substantially half the circumference of the outer circumferential surface of the collar member 12. The positioning groove part 12*d* has a groove width dimension G (dimension in the direction along the length direction of the collar member 12) set to a groove width dimension that is the same as or greater than the outer diameter dimension of the axially-shaped spring member 14 described below. Specifically, for example, the outer diameter dimension (diameter) of the spring member 14 is 2 mm, and the groove width dimension G is 2.9 mm. The positioning groove part 12*d* is integrally formed by resin molding as long as the collar member 12 is made of a synthetic resin, and is integrally formed in the collar member 12 even in the case of other materials, and therefore, the groove width G is formed with a high degree of precision.

As illustrated in FIG. 7, an axially-shaped spring member 14 is inserted into the positioning groove part 12*d*. The spring member 14 has a base end 14*a* formed in an R shape so as to define a surface on one end side in the length direction, and has an insertion end 14*b* formed by bending slightly on the other end side in the length direction, and a straight part 14*c* between the insertion end 14*b* and the base end 14*a*.

When assuming a flat surface, the spring member 14 is molded without twisting the axis of the spring member 14 so that the entirety from the base end 14*a* to the insertion end 14*b* via the straight part 14*c* lies flat on the flat surface.

For the spring member 14, the insertion end 14*b* extends in the outward direction of the collar member 12 through the positioning groove part 12*d* in the lateral direction intersecting the length direction of the collar member 12 and contacts the back surface 5*a* of the cored bar member 5, and the base end 14*a* contacts the back surface 5*a* of the cored bar member 5 which is outside the collar member 12. As a result, the straight part 14*c* of the spring member 14 is supported at both ends so as to be elastically deformable by the base end 14*a* and the insertion end 14*b* that are in contact with the cored bar member 5, and is installed in the positioning groove part 12*d* in an inserted state.

When the pin 11 is inserted into the collar member 12 and the insertion side tip 11*a* is seated in the seat part 23, the spring member 14 is inserted into the positioning groove part 12*d* from the outside of the collar member 12. The spring member 14 is elastically and disengagably locked to hold the pin 11 against the locking groove part 11*b* of the pin 11 and the seat 23, thereby retaining the pin 11 in the collar member 12.

The spring member 14 may be arranged in the positioning groove part 12*d* in advance prior to inserting the pin 11 into the collar member 12.

As illustrated in FIG. 4, the back side of the cored bar member 5 is formed in a way in which the spring member 14 is sandwiched between the flange 12*a* side of the collar member 12 and the seat part 23 side in the length direction (Z-axis direction) of the collar member 12. The spring member 14, when engaged in the locking groove part 11*b* of the pin 11, is preferably held in place by the elastic force of the horn spring to contact the back side of the cored bar member 5 on the flange portion 12*a* side and a gap D1 is created between the spring member and the back side of the cored bar member 5 on the seat part 23 side.

In addition, the groove width of the locking groove part 11*b* (the length direction dimension of the pin 11 being the same as the length direction of the collar member 12) can be set larger than the outer diameter dimension of the spring member 14, and is preferably set such that the spring member 14 contacts with the seat part 23 side of the locking groove part 11*b* and creates a gap D2 on the flange 12*a* side of the locking groove part 11*b*.

When mounting and securing the pin 11 of the damper unit 10 to the cored bar member 5, first the collar member 12 is engaged into the hole 13 of the cored bar member 5.

The pin 11 is then set to the airbag module 2 side. Here, the horn spring 15 is installed so as to surround the pin 11. The insertion side tip 11*a* of the pin 11 of the damper unit 10 mounted to the airbag module 2 is inserted into the opening 12*b* of the collar member 12 while in contact with the horn spring 15 of the flange 12 of the collar member 12.

Thereafter, while compressing the horn spring 15, the pin 11 is inserted toward the seat part 23 of the collar member 12, and the insertion side tip 11*a* is seated in the seat part 23.

Here, the spring member 14 that has been previously inserted into the positioning groove part 12*d* so as to protrude toward the inside of the collar member 12 is pressed along the inclined portion of the cone-shaped insertion side tip 11*a* accompanying insertion into the collar member 12 of the pin 11, and is elastically deformed toward the outside of the positioning groove part 12*d*. When the insertion side tip 11*a* is seated in the seat part 23, the spring member 14 recovers elastically and is fitted into and locked into the locking groove part 11*b* of the pin 11, and the pin 11 is set inside the collar member 12 (in a so-called "snap-in" assembly method).

The spring member 14 is inserted through the positioning groove part 12*d* on the back side of the cored bar member 5 and is locked into the locking groove part 11*b*. As a result, the insertion side tip 11*a* of the pin 11 is held by the seat part 23 along the length direction of the collar member 12, and the locking groove part 11*b* is retained by the locking of the spring member 14.

The pin 11 is biased toward the airbag module 2 in the length direction (Z-axis direction) of the pin 11 through the damper unit 10 by the horn spring 15, and at the same time, is retained by the collar member 12 resisting the elastic biasing force of the horn spring 15 from the spring member 14, such that in a state of rest, the pin 11 can be retained against the collar member 12 without any looseness. Moreover, even if vibration is applied due to transmission of vibration between the cored bar member 5 and the airbag module 2, the spring member 14 and the horn spring 15 can suppress vibration (movement) of the pin 11 in the length direction (Z-axis direction) of the collar member 12.

As the groove width G dimension of the positioning groove part 12*d* can be adjusted to the outer diameter of the spring member 14 with high dimensional accuracy by integrally forming with resin molding or the like, the spring member 14, which engages the locking groove part 11*b*, is restricted from moving inside the positioning groove part 12*d*.

Because the spring member 14 is elastically deformable, the pin 11 is permitted to move in the length direction of the collar member 12 slightly, preventing excessive fixation intensity, and allowing for favorable disassemble workability to be ensured.

Even if slight movement of the pin 11 occurs based on the spring member 14, the seat part 23 is integrally molded with the collar member 12 by resin molding or the like, thus preventing noise.

In addition, because the seat part 23 is composed of a plurality of lever pieces 23*a*, the movement of the pin 11 can be elastically absorbed.

As the seat part 23 and the lever pieces 23*a* are provided with the grip 23*b*, the insertion side tip 11*a* can be stably seated with respect to the seat part 23, and unnecessary movement of the pin 11 inside the collar member 12 can be restricted.

As described above, the mounting pin member 11 can be mounted and secured to the cored bar member 5 with no looseness, and therefore, allows for efforts in improving noise reduction and durability. This ensures appropriate vibration transmission to the damper unit 10 and also to the airbag module 2 via the mounting pin member 11, significantly improving the vibration damping of the steering wheel 1.

When disassembling from a mounted and secured state, the elasticity of the spring member 14 is used to separate the spring member 14 from the locking groove part 11b and release the spring member 14 from the positioning groove part 12d. After removing the spring member 14, the pin 11 can be pulled out of the collar member 12 and the disassembly operation can be completed simply by pulling the airbag module 2 away from the cored bar member 5.

The component structure is exceedingly simple, being composed simply by including a collar member 12 made with a synthetic resin suitable for molding, which can be formed by resin molding to integrally include the opening 12b, seat part 23, and positioning groove part 12d, for example, forming the locking groove part 11b on the pin 11, and including the spring member 14 to be locked in the locking groove part 11b. Therefore, mounting and disassembly work with these components is also simple, and can be done with the insertion and extraction of the pin 11 in the collar member 12 and the attachment and detachment of the spring member 14 to the positioning groove part 12d. This enables ensuring superior mounting workability and disassembly workability.

The mounting and securing structure for the damper unit of the steering wheel as described above is a preferred example of the present invention, and other embodiments can also be implemented or fulfilled with various types of methods. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

REFERENCE NUMERALS

1 Steering wheel
2 Airbag module
5 Cored bar member
10 Damper unit
11 Mounting pin member (pin)
11a Insertion side tip
11b Locking groove part
12 Collar member
12b Opening
12c Inner surface
12d Positioning groove part
14 Spring member
23 Seat part
23a Lever piece
23b Grip

The invention claimed is:

1. A mounting and securing structure for a damper unit of a steering wheel, comprising:
an airbag module as a damper mass, a damper unit to dampen vibration of the steering wheel, and in order to incorporate the damper unit between the steering wheel and the airbag module, being provided with a mounting pin member for the damper unit of either the steering wheel or the airbag module,
a collar member formed in a hollow cylinder with an opening on one end in a length direction, where the mounting pin member is inserted and is provided secured on a support part, a seat part provided on other end in the length direction of the collar member where an insertion side tip of the mounting pin member is seated, a positioning groove part positioned on the collar member between the seat part and the opening and formed in a direction in an orientation intersecting the length direction, a locking groove part formed on the mounting pin member which becomes positioned on the positioning groove part when the insertion side tip is seated in the seat part, and a spring member provided on the support part inserted through the positioning groove part and is elastically locked by the locking groove part when the insertion side tip is seated in the seat part and retains the mounting pin member.

2. The mounting and securing structure for the damper unit of the steering wheel according to claim 1, wherein the seat part comprises a plurality of lever pieces protruding cantilevered from an inner surface of a hollow cylindrical collar member.

3. The mounting and securing structure for the damper unit of the steering wheel according to claim 1, wherein the seat part is provided with a grip for grasping the insertion side tip of the mounting pin member.

4. The mounting and securing structure for the damper unit of the steering wheel according to claim 2, wherein the seat part is provided with a grip for grasping the insertion side tip of the mounting pin member.

5. A steering wheel provided with the mounting and securing structure for the damper unit of a steering wheel according to claim 1.

6. A steering wheel provided with the mounting and securing structure for the damper unit of a steering wheel according to claim 2.

7. A steering wheel provided with a mounting and securing structure for the damper unit of a steering wheel according to claim 3.

8. A steering wheel provided with a mounting and securing structure for the damper unit of a steering wheel according to claim 4.

* * * * *